(12) United States Patent
Lee et al.

(10) Patent No.: US 7,583,629 B2
(45) Date of Patent: Sep. 1, 2009

(54) REFERENCING OF DOWNLINK CHANNELS IN WIRELESS COMMUNICATION SYSTEM

(75) Inventors: Young Dae Lee, Kyoungki-do (KR); Sung Duck Chun, Anyang (KR); Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 11/109,542

(22) Filed: Apr. 18, 2005

(65) Prior Publication Data

US 2005/0272459 A1    Dec. 8, 2005

Related U.S. Application Data

(60) Provisional application No. 60/563,869, filed on Apr. 19, 2004.

(51) Int. Cl.
    *H04W 4/00*   (2006.01)
(52) U.S. Cl. .................. 370/329; 370/294; 370/280; 370/281; 370/295; 370/478; 370/336; 370/337; 370/442; 370/312; 370/480; 455/450; 455/452.1; 709/229; 709/234; 709/235; 709/247
(58) Field of Classification Search .................. 370/329, 370/278, 280–282, 294–295, 336–337, 344, 370/347, 442, 478, 480, 312; 455/450–453; 709/229, 234, 235, 247
    See application file for complete search history.

(56) References Cited

U.S. PATENT DOCUMENTS

| | | | |
|---|---|---|---|
| 6,473,410 B1 | 10/2002 | Sakoda et al. | |
| 6,628,946 B1 * | 9/2003 | Wiberg et al. | 455/434 |
| 6,684,081 B2 | 1/2004 | Sarkkinen et al. | |
| 2003/0147389 A1 * | 8/2003 | Zirwas | 370/390 |
| 2004/0002342 A1 * | 1/2004 | Goldberg et al. | 455/455 |
| 2004/0152473 A1 * | 8/2004 | Kuwano et al. | 455/456.2 |
| 2005/0090278 A1 | 4/2005 | Jeong et al. | |
| 2005/0147127 A1 | 7/2005 | Putcha et al. | |
| 2005/0157669 A1 * | 7/2005 | Zhu et al. | 370/312 |
| 2005/0237972 A1 | 10/2005 | Van Dervelde et al. | |

FOREIGN PATENT DOCUMENTS

| | | |
|---|---|---|
| RU | 2113772 C1 | 6/1998 |
| WO | 2004/002021 | 12/2003 |
| WO | 2004/017540 | 2/2004 |

\* cited by examiner

*Primary Examiner*—Rafael Pérez-Gutiérrez
*Assistant Examiner*—Nimesh Patel
(74) *Attorney, Agent, or Firm*—Lee, Hong, Degerman, Kang & Waimey

(57) ABSTRACT

The present invention relates to a method for referencing a physical channel carrying point-to-multipoint service data in a wireless communication system. The present invention utilizes an identifier to reference specific physical channel configurations previously sent to a mobile terminal from a network. The identifier may reference an entry in a list of physical channel configuration in a specific message. Alternatively, a physical channel configuration in a first message is first allocated a specific identity. Then, a specific identifier referencing the specific identity is used in a second message to identify the physical channel configuration in the first message.

20 Claims, 9 Drawing Sheets

REFERENCING OF DOWNLINK CHANNELS IN WIRELESS COMMUNICATION SYSTEM

CROSS-REFERENCE TO RELATED APPLICATIONS

Pursuant to 35 U.S.C. § 119(e), this application claims the benefit of earlier filing date and right of priority to U.S. Provisional Application No. 60/563,869, filed on Apr. 19, 2004, the contents of which are hereby incorporated by reference herein in its entirety.

BACKGROUND OF THE INVENTION

1. Field of the Invention

The present invention relates to referencing a physical channel carrying point-to-multipoint service data in a wireless communication system, and more particularly, to the use of an identifier to reference specific physical channel configurations previously sent to a mobile terminal from a network.

2. Description of the Related Art

Recently, mobile communication systems have developed remarkably, but for high capacity data communication services, the performance of mobile communication systems cannot match that of existing wired communication systems. Accordingly, technical developments for IMT-2000, which is a communication system allowing high capacity data communications, are being made and standardization of such technology is being actively pursued among various companies and organizations.

A universal mobile telecommunication system (UMTS) is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1 of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a terminal (or user equipment: UE) 10, a UTRAN 100, and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111. The RNC 111 handles the assigning and managing of radio resources, and operates as an access point with respect to the core network 200.

The Node-Bs 112, 113 receive information sent by the physical layer of the terminal through an uplink, and transmit data to the terminal through a downlink. The Node-Bs 112, 113, thus, operate as access points of the UTRAN 100 for the terminal.

A primary function of the UTRAN 100 is forming and maintaining a radio access bearer (RAB) to allow communication between the terminal and the core network 200. The core network 200 applies end-to-end quality of service (QoS) requirements to the RAB, and the RAB supports the QoS requirements set by the core network 200. As the UTRAN 100 forms and maintains the RAB, the QoS requirements of end-to-end are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching center (MSC) 210 and a gateway mobile switching center (GMSC) 220 connected together for supporting a circuit switched (CS) service, and a serving GPRS support node (SGSN) 230 and a gateway GPRS support node 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 111 are connected to the MSC 210 of the core network 200, and the MSC 210 is connected to the GMSC 220 that manages the connection with other networks.

For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet.

Various types of interfaces exist between network components to allow the network components to transmit and receive information to and from each other for mutual communication therebetween. An interface between the RNC 111 and the core network 200 is defined as an Iu interface. In particular, the Iu interface between the RNCs 111 and the core network 200 for packet switched systems is defined as "Iu-PS," and the Iu interface between the RNCs 111 and the core network 200 for circuit switched systems is defined as "Iu-CS."

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH) and a paging control channel (PCCH) or a Shared Channel Control Channel (SHCCH). The BCCH provides information including information utilized by a terminal to access a system. The PCCH is used by the UTRAN to access a terminal.

A Multimedia Broadcast/Multicast Service (MBMS or "MBMS service") refers to a method of providing streaming or background services to a plurality of UEs using a downlink-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs within a broadcast area, for example the domain where the broadcast is available. The multicast mode is for transmitting multimedia data to a specific UE group within a multicast area, for example the domain where the multicast service is available.

For purposes of MBMS, additional traffic and control channels exist. For example, an MCCH (MBMS point-to-multipoint Control Channel) is used for transmitting MBMS control information while an MTCH (MBMS point-to-multipoint Traffic Channel) is used for transmitting MBMS service data.

The different logical channels that exist are listed below:

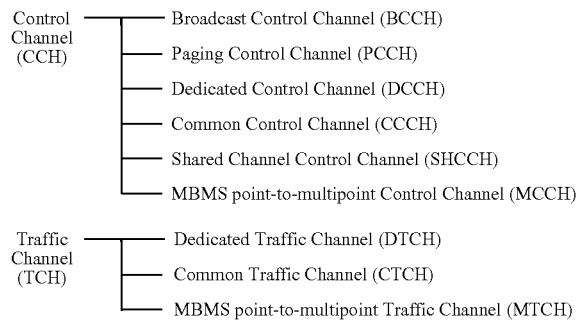

The MAC layer is connected to the physical layer by transport channels and can be divided into a MAC-b sub-layer, a MAC-d sub-layer, a MAC-c/sh sub-layer, and a MAC-hs sub-layer according to the type of transport channel to be managed.

The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

The MAC-c/sh sub-layer manages a common transport channel, such as a forward access channel (FACH) or a downlink shared channel (DSCH), which is shared by a plurality of terminals, or in the uplink the Radio Access Channel (RACH). In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sublayer exists in each terminal (UE). Referring to FIG. 3, possible mapping between the logical channels and the transport channels from a UE perspective is shown. Referring to FIG. 4, possible mapping between the logical channels and the transport channels from a UTRAN perspective is shown.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a 'CB message', hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol, such as an IPv4 or IPv6, to be effectively transmitted on a radio interface with a relatively small bandwidth. To achieve this, the PDCP layer reduces unnecessary control information used in a wired network, a function called header compression.

A radio resource control (RRC) layer is located at a lowermost portion of the L3 layer. The RRC layer is defined only in the control plane, and handles the control of logical channels, transport channels, and physical channels with respect to setup, reconfiguration, and release or cancellation of radio bearers (RBs). The radio bearer service refers to a service provided by the second layer (L2) for data transmission between the terminal and the UTRAN. In general, the setup of the radio bearer refers to the process of defining the characteristics of a protocol layer and a channel required for providing a specific data service, as well as respectively setting detailed parameters and operation methods.

The RLC layer can belong to the user plane or to the control plane depending upon the type of layer connected at the upper layer of the RLC layer. That is, if the RLC layer receives data from the RRC layer, the RLC layer belongs to the control plane. Otherwise, the RLC layer belongs to the user plane.

The different possibilities that exist for the mapping between the radio bearers and the transport channels are not always possible. The UE/UTRAN deduces the possible mapping depending on the UE state and the procedure that the UE/UTRAN is executing. The different states and modes are explained in more detail below.

The different transport channels are mapped onto different physical channels. For example, the RACH transport channel is mapped on a given PRACH, the DCH can be mapped on the DPCH, the FACH and the PCH can be mapped on the S-CCPCH, the DSCH is mapped on the PDSCH and so on. The configuration of the physical channels is given by an RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

In contrast, the UTRAN cannot determine the existence of a terminal in idle mode. The existence of idle mode terminals can only be determined by the core network. Specifically, the core network can only detect the existence of idle mode terminals within a region that is larger than a cell, such as a location or a routing area. Therefore, the existence of idle mode terminals is determined within large regions. In order to receive mobile communication services such as voice or data, the idle mode terminal must move or change into the RRC connected mode. The possible transitions between modes and states are shown in FIG. 5.

A UE in RRC connected mode can be in different states, such as a CELL_FACH state, a CELL_PCH state, a CELL_DCH state or a URA_PCH state. Depending on the states, the UE listens to different channels. For example a UE in CELL_DCH state will try to listen (amongst others) to DCH type of transport channels, which comprises DTCH and DCCH transport channels, and which can be mapped to a certain DPCH. The UE in CELL_FACH state will listen to several FACH transport channels which are mapped to a certain S-CCPCH physical channel. The UE in PCH state will listen to the PICH channel and to the PCH channel, which is mapped to a certain S-CCPCH physical channel.

The UE also carries out different actions depending on the state. For example, based on different conditions, a UE in CELL_FACH will start a CELL Update procedure each time the UE changes from the coverage of one cell into the coverage of another cell. The UE starts the CELL Update procedure by sending to the NodeB a Cell Update message to indicate that the UE has changed its location. The UE will then start listening to the FACH. This procedure is additionally used when the UE comes from any other state to CELL_FACH state and the UE has no C-RNTI available, such as when the UE comes from the CELL_PCH state or CELL_DCH state, or when the UE in CELL_FACH state was out of coverage.

In the CELL_DCH state, the UE is granted dedicated radio resources, and may additionally use shared radio resources. This allows the UE to have a high data rate and efficient data exchange. However, the radio resources are limited. It is the responsibility of the UTRAN to allocate the radio resources amongst the UEs such that they are efficiently used and ensure that the different UEs obtain the quality of service required.

A UE in CELL_FACH state has no dedicated radio resources attributed, and can only communicate with the UTRAN via shared channels. Thus, the UE consumes few radio resources. However, the data rate available is very limited. Also, the UE needs to permanently monitor the shared channels. Thus, UE battery consumption is increased in the case where the UE is not transmitting.

A UE in CELL_PCH/URA_PCH state only monitors the paging channel at dedicated occasions, and therefore minimizes the battery consumption. However, if the network wishes to access the UE, it must first indicate this desire on the paging occasion. The network may then access the UE, but only if the UE has replied to the paging. Furthermore, the UE can only access the network after performing a Cell Update procedure which introduces additional delays when the UE wants to send data to the UTRAN.

Main system information is sent on the BCCH logical channel, which is mapped on the P-CCPCH (Primary Common Control Physical Channel). Specific system information blocks can be sent on the FACH channel. When the system information is sent on the FACH, the UE receives the configuration of the FACH either on the BCCH that is received on the P-CCPCH or on a dedicated channel. The P-CCPCH is sent using the same scrambling code as a P-CPICH (Primary Common Pilot Channel), which is the primary scrambling code of the cell. Each channel uses a spreading code as commonly done in WCDMA (Wideband Code Division Multiple Access) systems. Each code is characterized by its spreading factor (SF), which corresponds to the length of the code. For a given spreading factor, the number of orthogonal codes is equal to the length of the code. For each spreading factor, the given set of orthogonal codes, as specified in the UMTS system, are numbered from 0 to SF-1. Each code can thus be identified by giving its length (i.e. spreading factor) and the number of the code. The spreading code that is used by the P-CCPCH is always of a fixed spreading factor 256 and the number is the number 1. The UE knows about the primary scrambling code either by information sent from the network on system information of neighboring cells that the UE has read, by messages that the UE has received on the DCCH channel, or by searching for the P-CPICH, which is sent using the fixed SF 256 and the spreading code number 0, and which transmits a fixed pattern.

The system information comprises information on neighboring cells, configuration of the RACH and FACH transport channels, and the configuration of MCCH, which is a channel dedicated for MBMS service. Each time the UE changes cells, it is camping or in idle mode. When the UE has selected the cell (in CELL_FACH, CELL_PCH or URA_PCH state), the UE verifies that it has valid system information.

The system information is organized in SIBs (system information blocks), a MIB (Master information block) and scheduling blocks. The MIB is sent very frequently and provides timing information of the scheduling blocks and the different SIBs. For SIBs that are linked to a value tag, the MIB also contains information on the last version of a part of the SIBs. SIBs that are not linked to a value tag are linked to an expiration timer. The SIBs linked to an expiration timer become invalid and need to be reread if the time of the last reading of the SIB is larger than an expiration timer value. The SIBs linked to a value tag are only valid if they have the same value tag as a value tag broadcast in the MIB. Each block has an area scope of validity, such as a Cell, a PLMN (Public Land Mobile Network) or an equivalent PLMN, which signifies on which cells the SIB is valid. A SIB with the area scope "Cell" is valid only for the cell in which it has been read. A SIB with the area scope "PLMN" is valid in the whole PLMN. A SIB with the area scope "equivalent PLMN" is valid in the whole PLMN and equivalent PLMN.

In general, UEs read the system information when they are in idle mode, CELL_FACH state, CELL_PCH state or in URA_PCH state of the cell that they have selected, i.e., the cell that they are camping on. In the system information, the UEs receive information on the neighboring cells on the same frequency, different frequencies and different RAT (Radio access technologies). This allows the UEs to know which cells are candidates for cell reselection.

The 3GPP system can provide multimedia broadcast multicast service (MBMS). The 3GPP TSG SA (Service and System Aspect) defines various network elements and their functions required for supporting MBMS services. A cell broadcast service provided by the prior art is limited to a service in which text type short messages are broadcast to a certain area. The MBMS service, however, is a more advanced service that multicasts multimedia data to terminals (UEs) that have subscribed to the corresponding service in addition to broadcasting multimedia data.

The MBMS service is a downward-dedicated service that provides a streaming or background service to a plurality of terminals by using a common or dedicated downward channel. The MBMS service is divided into a broadcast mode and a multicast mode. The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

FIG. 6 illustrates a process of providing a particular MBMS service, by using the multicast mode. The procedure can be split into two types of actions, those that are transparent and those that are not transparent to the UTRAN.

The transparent actions are described in the following. A user desiring to receive the MBMS service, first needs to subscribe in order to be allowed to receive MBMS services, to receive information on MBMS services, and to join a certain set of MBMS services. A service announcement provides the terminal with a list of services to be provided and other related information. The user can then join these services. By joining, the user indicates that the user wants to receive information linked to services that the user has subscribed to and becomes part of a multicast service group. When a user is no longer interested in a given MBMS service, the user leaves the service, i.e., the user is no longer part of the multicast service group. These actions can be taken by using any means of communication, i.e., the actions may be done using SMS (Short Messaging Service), or by Internet access. These actions do not have to necessarily be done using the UMTS system.

In order to receive a service for which the user is in a multicast group the following actions that are not transparent to the UTRAN are executed. The SGSN informs the RNC about a session start. Then the RNC notifies the UEs of the multicast group that a given service has started in order to initiate reception of the given service. After having broadcast the necessary UE actions and eventually the configuration of the PtM bearers for the given service the transmission of the data starts. When the session stops, the SGSN indicates the stopped session to the RNC. The RNC in turn initiates a session stop. The transmission of the service from the SGSN means for the RNC to provide a bearer service for conveying the data of the MBMS service.

After the notification procedure, other procedures can be initiated between the UE and the RNC and the SGSN to enable data transmission, such as RRC connection establishment, connection establishment towards the PS domain, frequency layer convergence, and counting.

Reception of an MBMS service may be performed in parallel to the reception of other services, such as a voice or video call on the CS domain, SMS transfer on the CS or PS domain, data transfer on the PS domain, or any signaling related to the UTRAN or PS or CS domain.

Contrary to the multicast service, for broadcast services, as shown in FIG. 7, only the announcement of the service must be done in a transparent manner. No subscription or joining is needed. Afterwards, the actions that are transparent to the RNC are the same as for multicast services.

For MBMS, two additional control channels are introduced. They are the MCCH and the MICH (MBMS Notification Indicator Channel). As explained above, the MCCH is mapped on the FACH. The MICH is a new physical channel and is used to notify users to read the MCCH channel. The MICH is designed to allow the UEs to perform a DRX (Discontinuous Reception) scheme. DRX allows the reduction of battery consumption for UEs while allowing the UEs to still be aware of any service for which a session is starting. The MICH may be used to inform the UE of a change in a frequency convergence scheme, change of a configuration of a point-to-multipoint (PtM) bearer, switch between the PtM bearer and a point-to-point (PtP) bearer, etc., which all require the MCCH to be read.

The MCCH channel periodically transmits information about active services, the configuration of the MTCH, information about frequency convergence, etc. The UE reads the MCCH information to be able to receive the subscribed services based on different triggers, i.e., after cell selection/reselection, when the UE is notified for a given service on MICH, when the UE is notified via the DCCH channel and other occasions.

A physical channel, such as a Secondary Common Control Physical Channel (S-CCPCH), is characterized by certain physical channel parameters, such as a spreading factor, a spreading code, a coding type, transport block sizes and other attributes. In general, when the UE needs to listen to the S-CCPCH, the UE is given a complete set of these physical parameters.

In one cell, there can exist several S-CCPCH channels. For dedicated services, the UE is generally only required to read one S-CCPCH channel. In case the UE receives several S-CCPCH channels, the UE compiles a list of S-CCPCH channels based on different criteria, such as all S-CCPCH that carry the PICH or all S-CCPCH channels that carry FACH channels. The S-CCPCH channels may be numbered from 0 to the number of S-CCPCHs that exist in the cell minus one. Accordingly, a formula may be produced such that the UE can calculate the number of the entry of the S-CCPCH channel that the UE shall listen to. For example, the number of the entry can be found by calculating the modulo of the UE identity and the number of S-CCPCHs available, as shown in FIG. 8.

This method implies that each UE will only listen to one S-CCPCH for the dedicated services, and that the S-CCPCH that the UE is listening to depends on the UE identity. As such, the UE will listen to the one S-CCPCH on the cell that the UE has selected.

For MBMS, the S-CCPCH channel is also used for transmitting point-to-multipoint (PtM) data. In certain cases, it is possible that the same MBMS data is sent on different cells. In case a UE is in between two cells where the same content is sent on S-CCPCH channels, it is advantageous to use a special physical layer combining scheme between the two cells, as shown in FIG. 9, where the UE takes advantage of the fact that similar data is transmitted on several cells, which the UE can receive. This increases the chances of the data being correctly received by the UE.

Referring to FIG. 9, a UE is in between cell 1 and cell 2. Cell 1 uses an S-CCPCH with configuration 1A, and another S-CCPCH with configuration 1B. Cell 2 uses S-CCPCHs with configuration 2A and 2B, respectively. In order to use the physical layer combining scheme, it is necessary to indicate to the UE which S-CCPCH from Cell 1 can be combined with which S-CCPCH from Cell 2.

In case that an MBMS service is sent on an S-CCPCH channel for which the configuration is already sent in the system information, it is inefficient to send the configuration again if a MTCH is mapped on a FACH of the S-CCPCH. Also, in case that physical layer combining is used, it is inefficient to repeat sending for each S-CCPCH configuration of the neighboring cell, the S-CCPCH configurations of the current cell with which it can be physical layer combined or vice versa.

SUMMARY OF THE INVENTION

The present invention is directed to a method for referencing a physical channel carrying point-to-multipoint service data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for referencing a physical channel carrying point-to-multipoint service data in a wireless communication system, the method comprising generating a first message comprising configuration information for each of at least one physical channel, organizing the configuration information for each of the at least one physical channel into a list in the first message, transmitting the first message to a mobile terminal, generating a second message for referencing at least one of the configuration information in the first message, wherein the configuration information is referenced by identifying a position of the configuration information in the list of the first message, and transmitting the second message to the mobile terminal.

Preferably, the first message is transmitted through a BCCH, wherein the first message is a system information message. Alternatively, the first message is transmitted through an MCCH, wherein the first message is a point-to-multipoint service control message.

Preferably, the second message is transmitted through an MCCH, wherein the second message is a point-to-multipoint service control message. Additionally, the physical channel is an SCCPCH.

In one aspect, the present invention is embodied in a method for referencing a physical channel carrying point-to-multipoint service data in a wireless communication system, the method comprising receiving a first message comprising configuration information for each of at least one physical channel, wherein the configuration information for each of the at least one physical channel is organized into a list in the first message, receiving a second message referencing at least one of the configuration information in the first message, wherein the configuration information is referenced by identifying a position of the configuration information in the list of the first message, and configuring the at least one physical channel according to the configuration information in the first message referenced by the second message.

Preferably, the first message is received through a BCCH, wherein the first message is a system information message. Alternatively, the first message is received through an MCCH, wherein the first message is a point-to-multipoint service control message.

Preferably, the second message is received through an MCCH, wherein the second message is a point-to-multipoint service control message. Additionally, the physical channel is an SCCPCH.

In another aspect, the present invention is embodied in a method for referencing a physical channel carrying point-to-multipoint service data in a wireless communication system, the method comprising generating a first message comprising configuration information for each of at least one physical channel, allocating a configuration identifier to each configuration information in the first message, transmitting the first message to a mobile terminal, generating a second message for referencing at least one of the configuration information in the first message, wherein the configuration information is referenced by identifying the configuration identifier, and transmitting the second message to the mobile terminal.

Preferably, the first message is received through a BCCH, wherein the first message is a system information message. Alternatively, the first message is received through an MCCH, wherein the first message is a point-to-multipoint service control message.

Preferably, the second message is received through an MCCH, wherein the second message is a point-to-multipoint service control message. Additionally, the physical channel is an SCCPCH.

In a further aspect, the present invention is embodied in a method for referencing a physical channel carrying point-to-multipoint service data in a wireless communication system, the method comprising receiving a first message comprising configuration information for each of at least one physical channel, wherein each configuration information is identified by a configuration identifier in the first message, receiving a second message referencing at least one of the configuration information in the first message, wherein the configuration information is referenced by identifying the configuration identifier, and configuring the at least one physical channel according to the configuration information in the first message referenced by the second message.

Preferably, the first message is received through a BCCH, wherein the first message is a system information message. Alternatively, the first message is received through an MCCH, wherein the first message is a point-to-multipoint service control message.

Preferably, the second message is received through an MCCH, wherein the second message is a point-to-multipoint service control message. Additionally, the physical channel is an SCCPCH.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 8 illustrates a method of calculating an entry number of a physical channel that a mobile terminal will listen to.

DETAILED DESCRIPTION OF THE PREFERRED EMBODIMENTS

The present invention relates to a method for referencing a physical channel carrying point-to-multipoint service data in a wireless communication system. The present invention utilizes an identifier to reference specific physical channel configurations previously sent to a mobile terminal from a network. By referencing a specific physical channel configuration already sent by the network and received by the mobile terminal, instead of sending or receiving the entire channel configuration again, network and mobile terminal resources are used more efficiently. In one embodiment, the identifier may reference an entry in a list of physical channel configurations in a specific message. In another embodiment, a physical channel configuration in a first message is first allocated a specific identity. Then, a specific identifier referencing the specific identity is used in a second message to identify the physical channel configuration in the first message.

Figure 1:
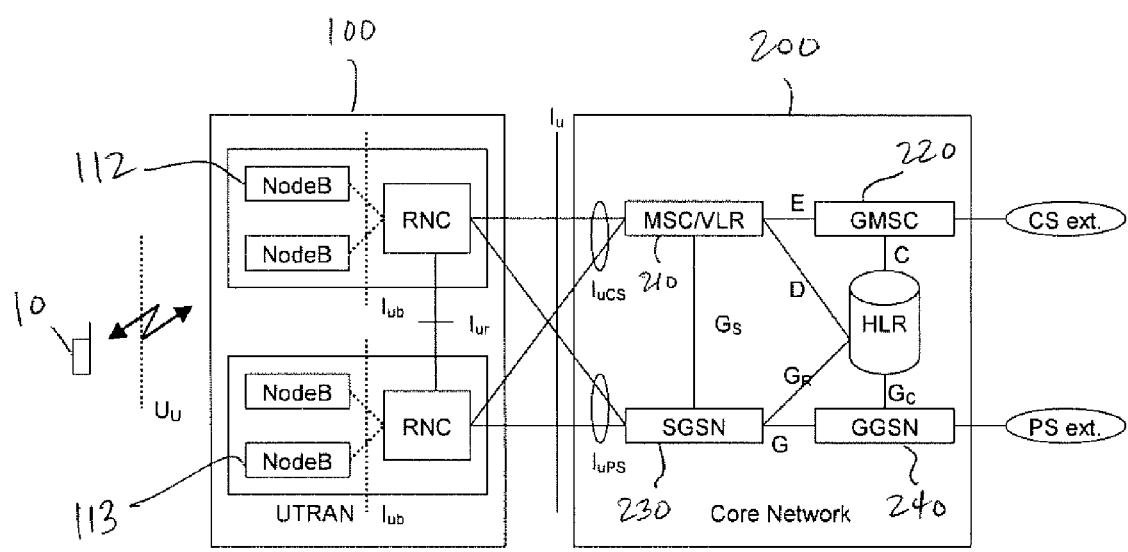
FIG. 1 is a block diagram of a general UMTS network architecture.
Figure 2:
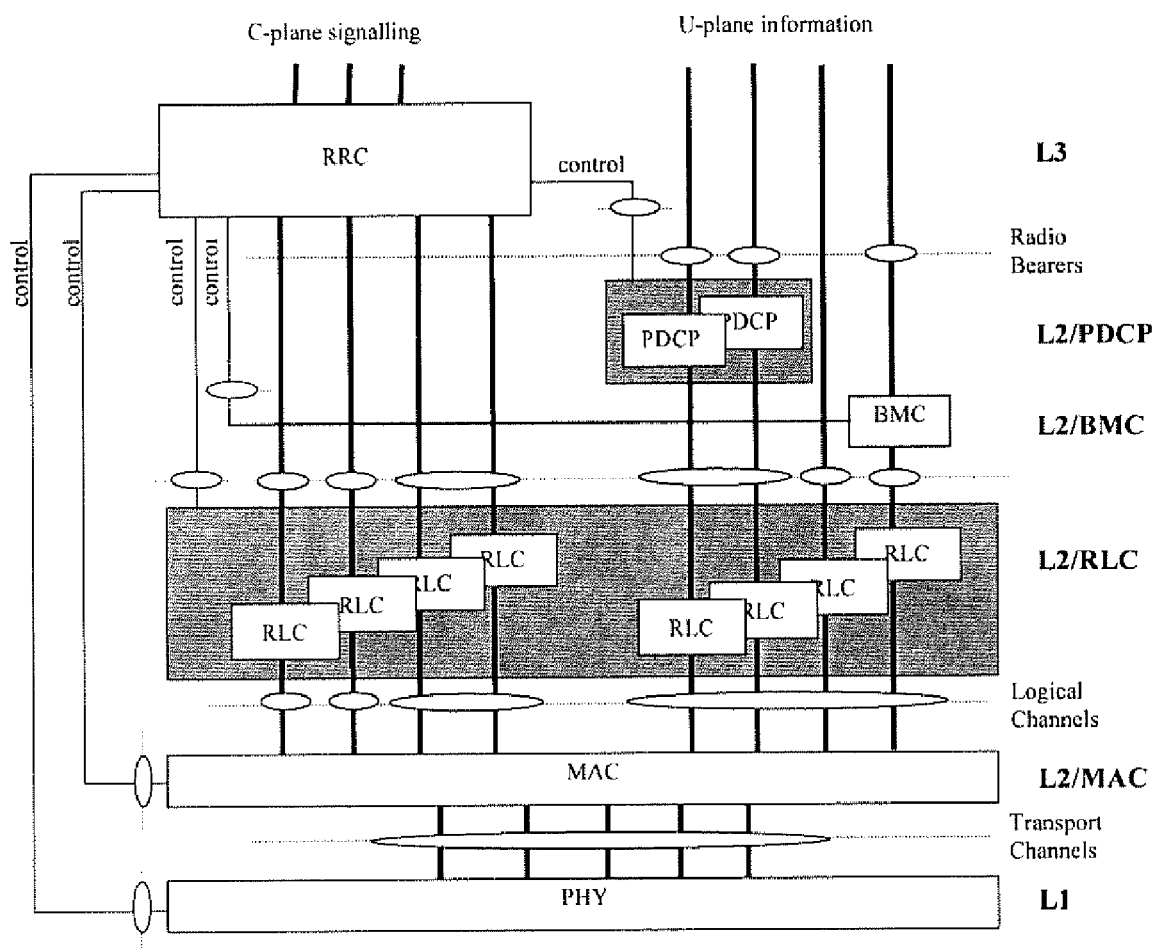
FIG. 2 is a block diagram of a structure of a radio interface protocol between a terminal and a network based on 3GPP radio access network standards.
Figure 3:
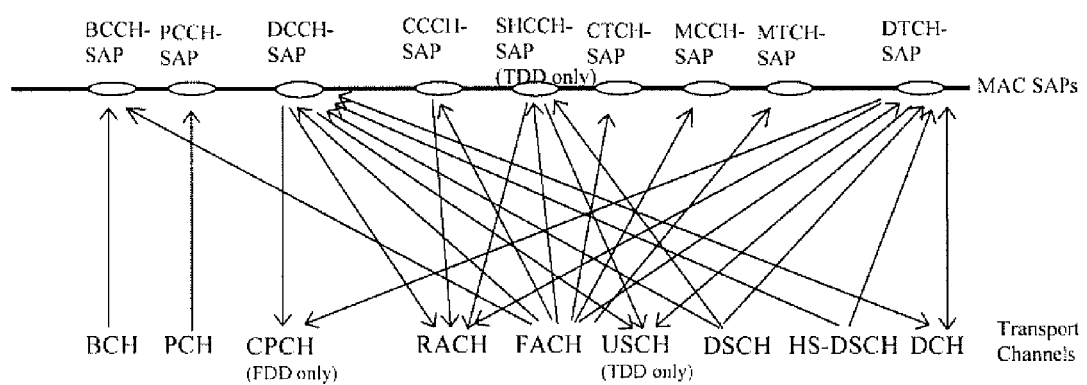
FIG. 3 illustrates the mapping of logical channels onto transport channels in the mobile terminal.
Figure 4:
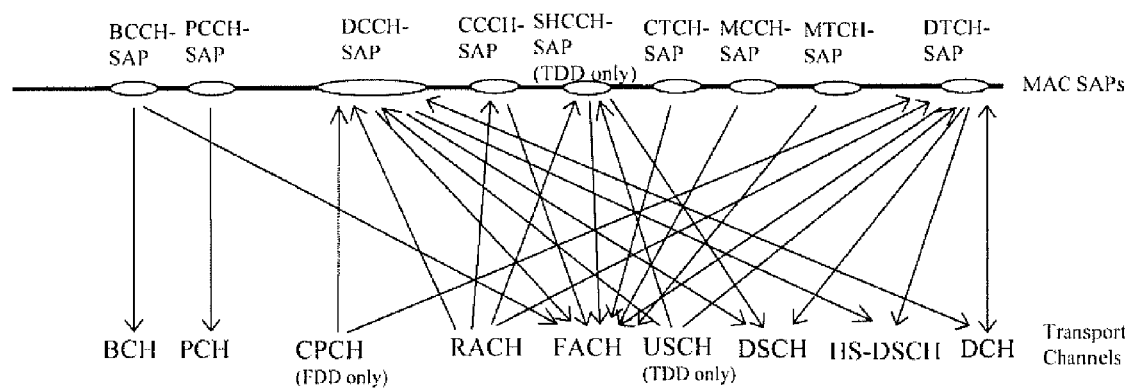
FIG. 4 illustrates the mapping of logical channels onto transport channels in the network.
Figure 5:
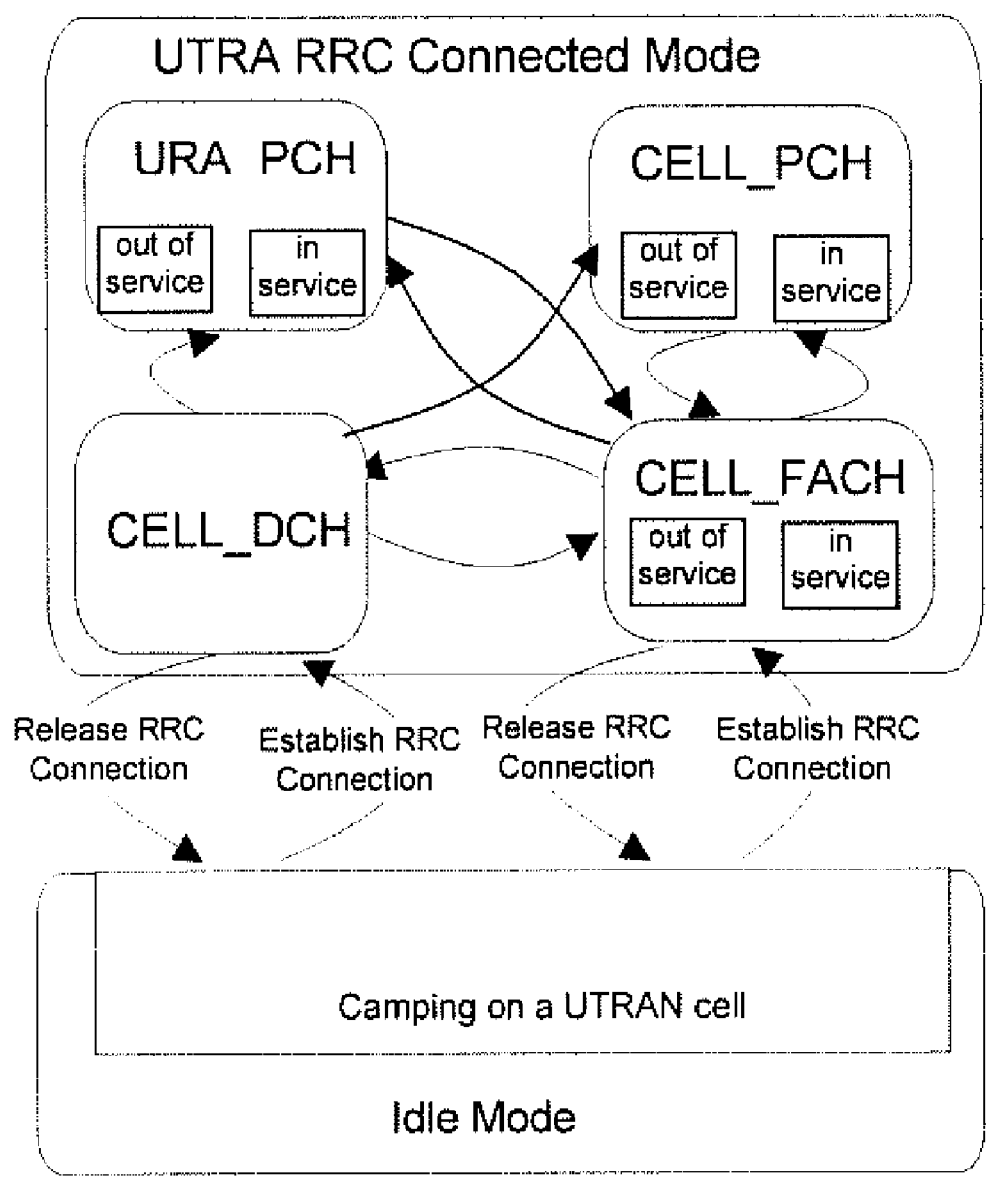
FIG. 5 illustrates possible transitions between modes and states in the UMTS network.
Figure 6:
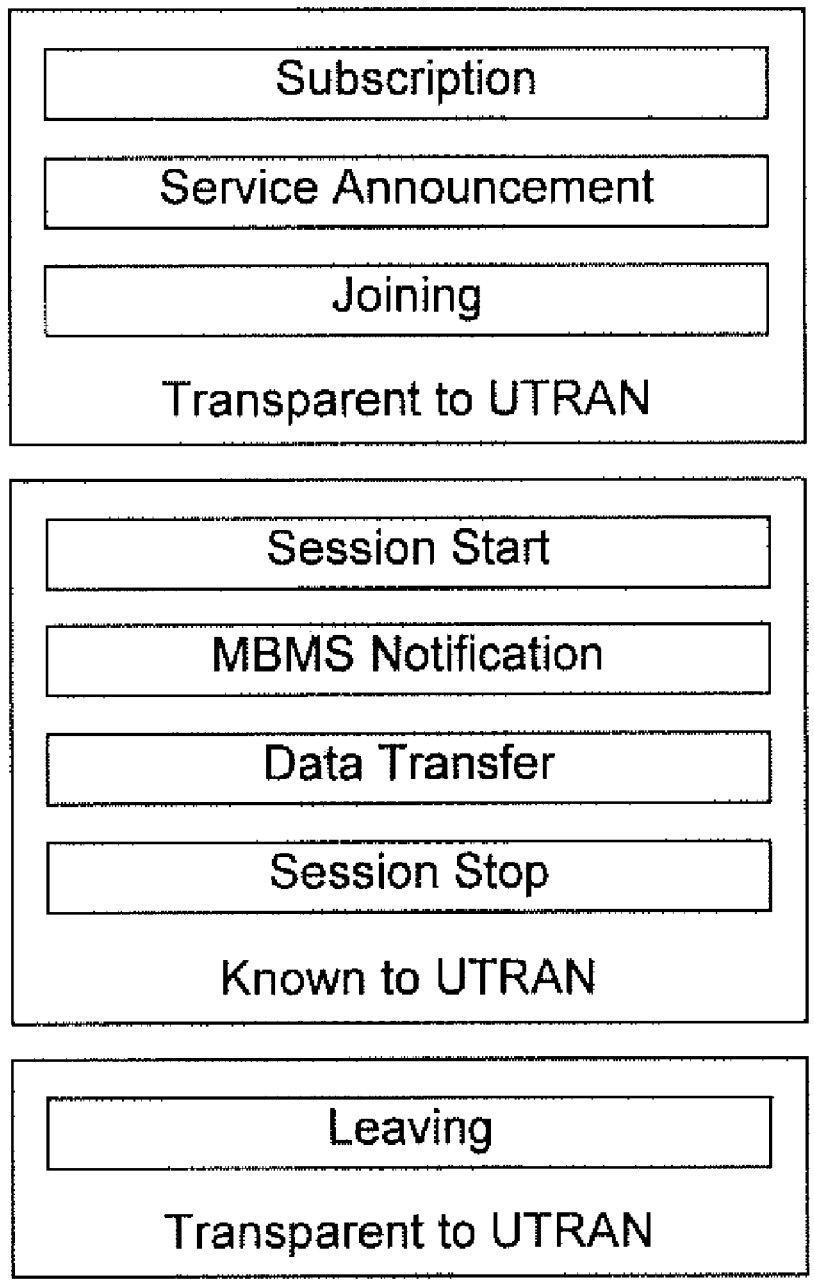
FIG. 6 illustrates a process of providing a particular MBMS service using a multicast mode.
Figure 7:
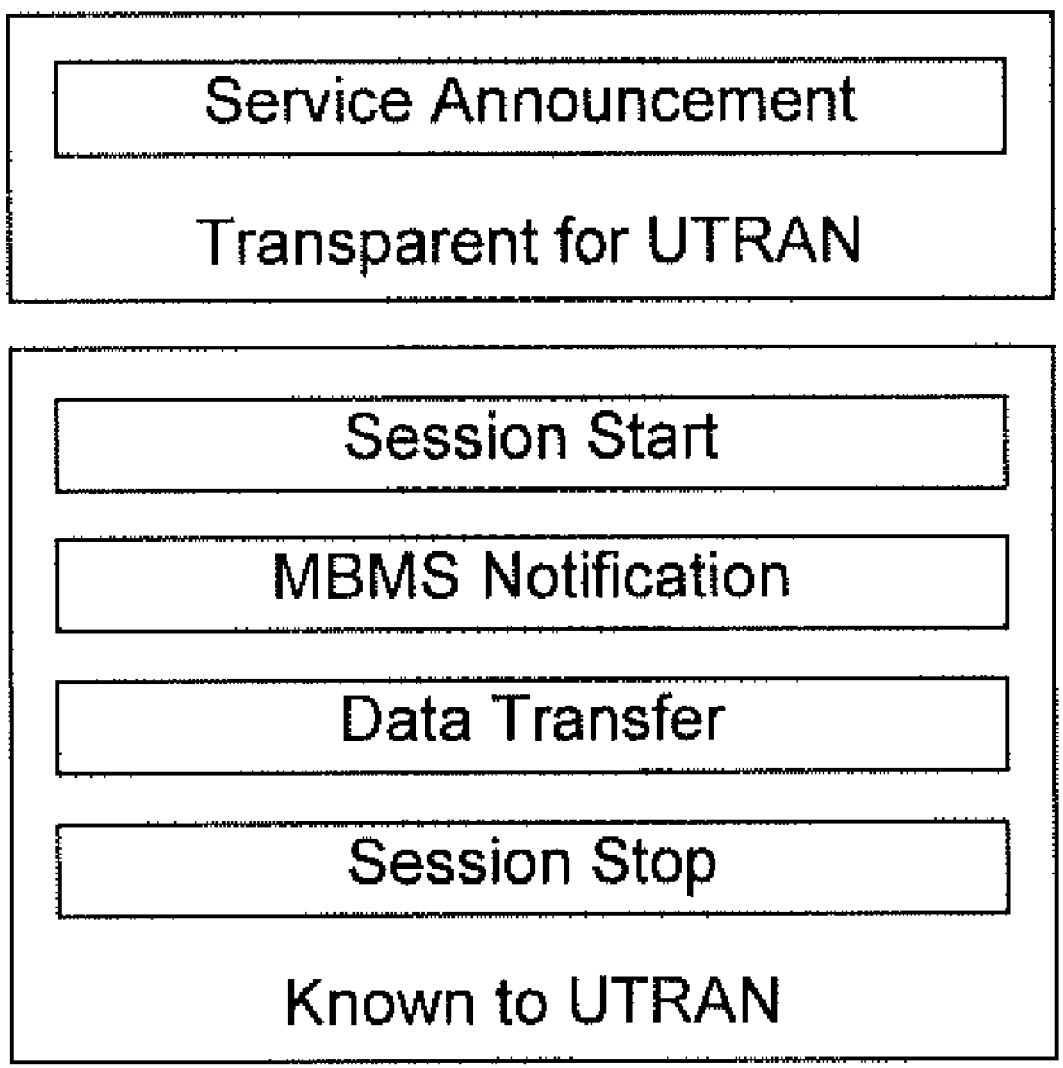
FIG. 7 illustrates a process of providing broadcast services.
Figure 8:
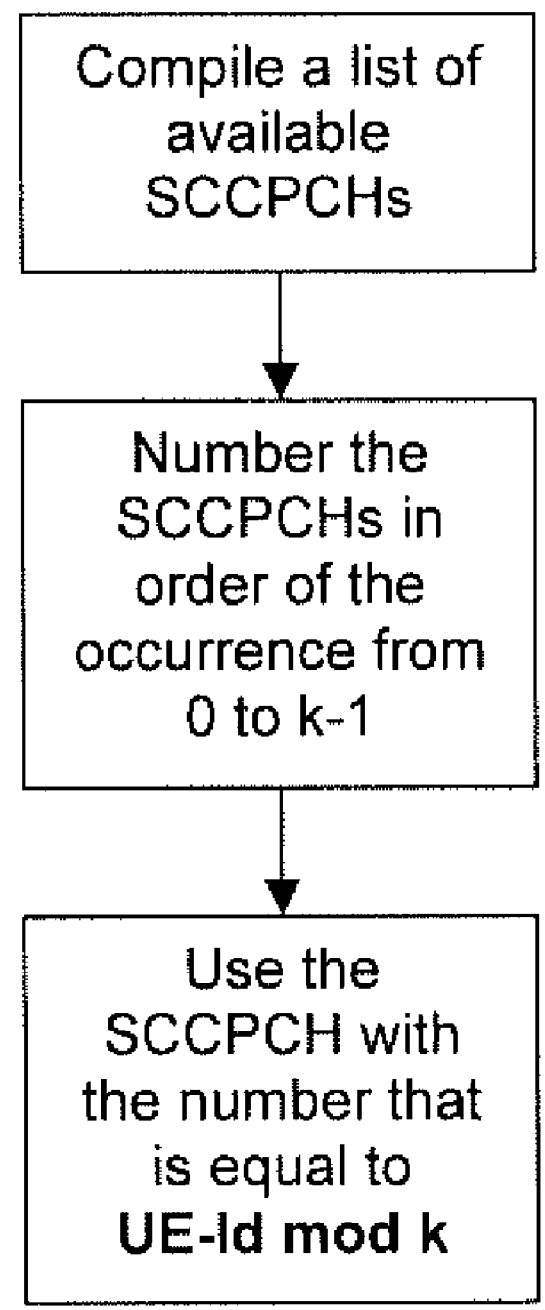
Figure 9:
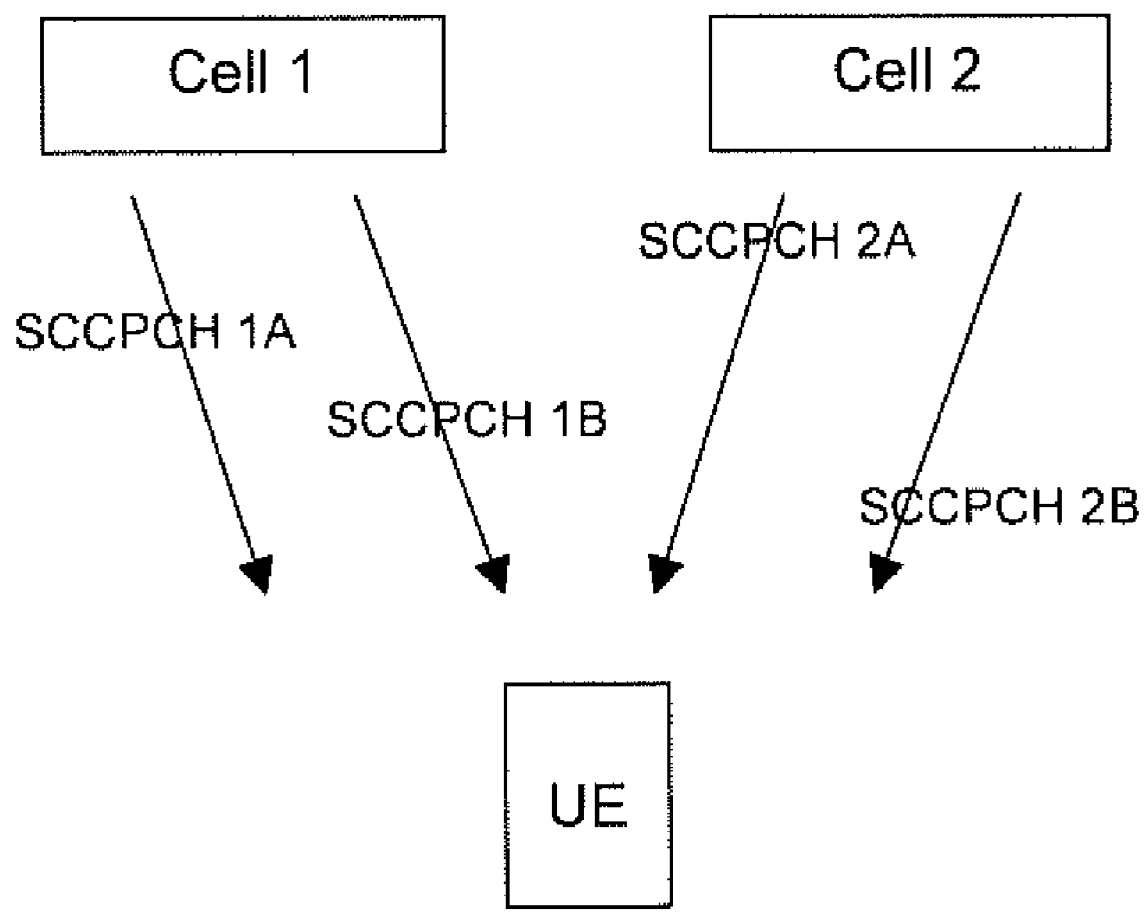
FIG. 9 illustrates a physical layer combining scheme between two cells.
Figure 10:
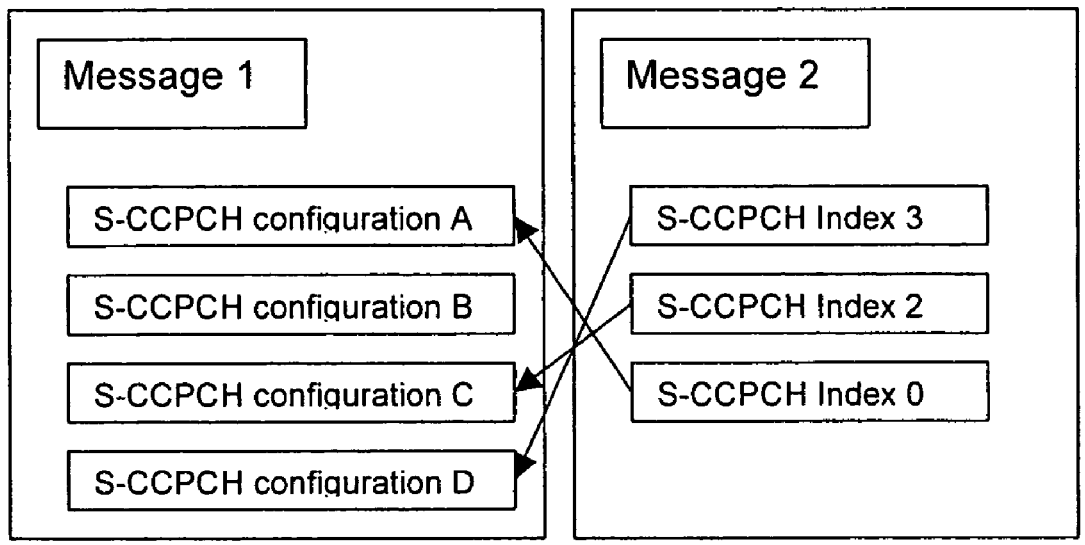
FIG. 10 is a diagram of a method for referencing a physical channel configuration using an implicit identifier, in accordance with a first embodiment of the present invention.

Referring to FIG. 10, a method for referencing physical channels in accordance with a first embodiment of the present invention is illustrated. A network generates a specific message comprising at least one physical channel configuration for transmitting to a mobile terminal. Preferably, the specific message comprises physical channel configurations of physical channels the mobile terminal may be interested in receiving, e.g., the specific message comprises physical channel configurations for physical channels on which MBMS services that the mobile terminal may want to receive are mapped. Generally, the physical channel configuration is information related to the characteristics of the physical channel and may include physical channel parameters, such as spreading factor, spreading code, coding type, transport block size and other attributes. Thus, the specific message including the physical channel configuration is transmitted to the mobile terminal to inform the terminal of the channel characteristics. The mobile terminal uses the channel characteristics to configure the reception of the physical channel.

As shown in FIG. 10, a Message 1 is generated by the network to inform the mobile terminal of physical channel characteristics for configuring the reception of a physical channel, such as a Secondary Common Control Physical Channel (SCCPCH). Typically, the SCCPCH is used to carry transport channels, such as Forward Access Channel (FACH) and Paging Channel (PCH). The Message 1 comprises a plurality of SCCPCH configurations, which are transmitted to the mobile terminal. Each SCCPCH configuration is associated with a respective physical channel SCCPCH. The Message 1 may be transmitted to the mobile terminal as a SIB 5 or SIB 6 message sent on a logical channel BCCH. Alternatively, the Message 1 may be transmitted to the mobile terminal as an MBMS specific message, such as an "MBMS CURRENT CELL P-T-M RB INFORMATION" message, or an "MBMS NEIGHBORING CELL P-T-M RB INFORMATION" message, which are sent on a logical channel MCCH. Preferably, the network organizes the SCCPCH configurations into a list in the Message 1, as shown in FIG. 10.

Further referring to FIG. 10, a Message 2 is generated by the network to also inform the mobile terminal of physical channel characteristics for configuring the reception of an SCCPCH. The Message 2 may be transmitted to the mobile terminal as an MBMS specific message, such as an "MBMS CURRENT CELL P-T-M RB INFORMATION" message, or an "MBMS NEIGHBORING CELL P-T-M RB INFORMATION" message, which are sent on a logical channel MCCH.

When subsequently informing the mobile terminal of physical channel characteristics, often the network will provide information on a specific SCCPCH for which the SCCPCH configuration had already been sent to the mobile terminal. Thus, to save resources, the present invention provides that the Message 2 reference the specific SCCPCH configuration in the Message 1 rather than re-sending the entire SCCPCH configuration. Upon receiving the Message 2, the mobile terminal refers to the SCCPCH configuration in the Message 1 referenced by the Message 2 and configures the reception of the SCCPCH according to the SCCPCH configuration in the Message 1. As such, the amount of data transmitted from the network and received by the mobile terminal is reduced. Thus, system resources are saved.

As shown in FIG. 10, the SCCPCH configurations in the Message 1 are preferably referenced in the Message 2 by an implicit identifier or SCCPCH Index number. The Message 2 may contain as many implicit identifiers as the number of SCCPCH configurations to be referenced in the Message 1. For example, assuming there are four SCCPCH configurations in the Message 1, such as SCCPCH configuration A, B, C and D in FIG. 10, there are a maximum of four implicit identifiers in the Message 2 for referencing the four SCCPCH configurations in the Message 1. Here, the implicit identifier identifies the entry number of the SCCPCH configuration in the list of the Message 1.

As shown in FIG. 10, three implicit identifiers in the Message 2 reference three SCCPCH configurations in the Message 1. Here, SCCPCH Index 3 corresponds to the fourth entry in the list of SCCPCH configurations in the Message 1.

Thus, SCCPCH Index 0 references SCCPCH configuration D. Similarly, SCCPCH Index 2 corresponds to the third entry in the list of SCCPCH configurations in the Message 1. Therefore, SCCPCH Index 2 references SCCPCH configuration C. Also, SCCPCH Index 0 corresponds to the first entry in the list of SCCPCH configurations in the Message 1. Accordingly, SCCPCH Index 0 references SCCPCH configuration A.

Figure 11:
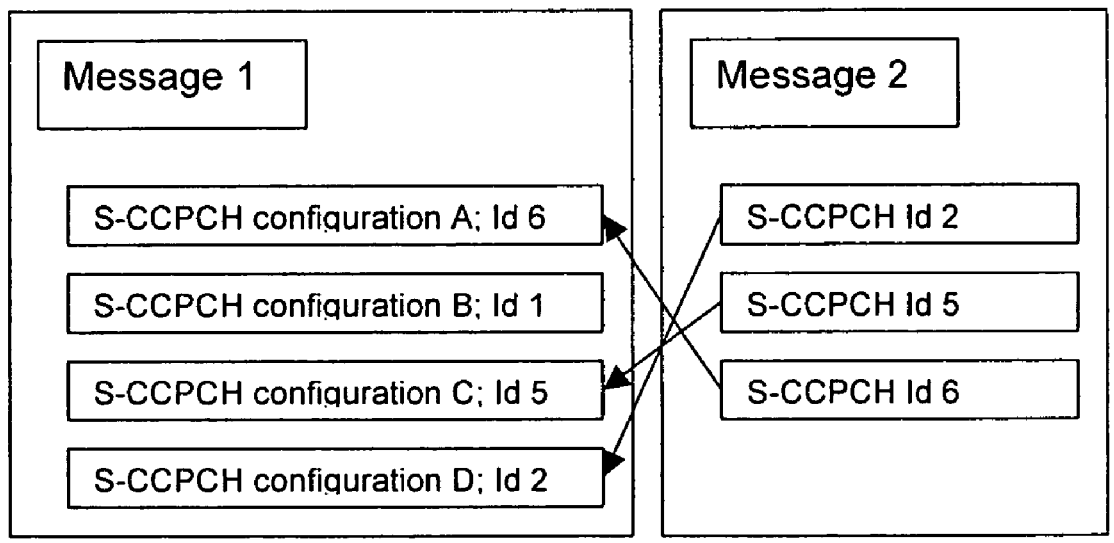
FIG. 11 is a diagram of a method for referencing a physical channel configuration using an explicit identifier, in accordance with a second embodiment of the present invention.

Referring to FIG. 11, a method for referencing physical channels in accordance with a second embodiment of the present invention is illustrated.

As shown in FIG. 11, a Message 1 is generated by the network to inform the mobile terminal of physical channel characteristics for configuring the reception of an SCCPCH. The Message 1 comprises a plurality of SCCPCH configurations, which are transmitted to the mobile terminal. Each SCCPCH configuration is associated with a respective physical channel SCCPCH that the mobile terminal is interested in receiving. The Message 1 may be transmitted to the mobile terminal as a SIB 5 or SIB 6 message sent on a logical channel BCCH. Alternatively, the Message 1 may be transmitted to the mobile terminal as an MBMS specific message, such as an "MBMS CURRENT CELL P-T-M RB INFORMATION" message, or an "MBMS NEIGHBORING CELL P-T-M RB INFORMATION" message, which are sent on a logical channel MCCH. Preferably, the network allocates a configuration identifier or Id number to each SCCPCH configuration in the Message 1.

Further referring to FIG. 11, a Message 2 is generated by the network to also inform the mobile terminal of physical channel characteristics for configuring the reception of an SCCPCH. The Message 2 may be transmitted to the mobile terminal as an MBMS specific message, such as an "MBMS CURRENT CELL P-T-M RB INFORMATION" message, or an "MBMS NEIGHBORING CELL P-T-M RB INFORMATION" message, which are sent on a logical channel MCCH.

When subsequently informing the mobile terminal of physical channel characteristics, often the network will provide information on a specific SCCPCH for which the SCCPCH configuration had already been sent to the mobile terminal. Thus, to save resources, the present invention provides that the Message 2 reference the specific SCCPCH configuration in the Message 1 rather that re-sending the entire SCCPCH configuration. Upon receiving the Message 2, the mobile terminal refers to the SCCPCH configuration in the Message 1 referenced by the Message 2 and configures the reception of the SCCPCH according to the SCCPCH configuration in the Message 1. As such, the amount of data is transmitted from the network and received by the mobile terminal is reduced. Thus, system resources are saved.

As shown in FIG. 11, the SCCPCH configurations in the Message 1 are preferably referenced in the Message 2 by an explicit identifier or SCCPCH Identification (Id) number. The Message 2 may contain as many explicit identifiers as the number of SCCPCH configurations to be referenced in the Message 1. For example, assuming there are four SCCPCH configurations in the Message 1, such as SCCPCH configuration A, B, C and D in FIG. 11, there are a maximum of four explicit identifiers in the Message 2 for referencing the four SCCPCH configurations in the Message 1. Here, the explicit identifier identifies the specific identity of an SCCPCH configuration found in the Message 1 by referencing the Id number allocated to the SCCPCH configuration by the network.

As shown in FIG. 11, three explicit identifiers in the Message 2 reference three SCCPCH configurations in the Message 1. The SCCPCH configurations have been randomly allocated specific Id numbers by the network. In order to reference an SCCPCH configuration in the Message 2, the specific Id number is used. Here, SCCPCH configuration A is allocated Id 6, SCCPCH configuration C is allocated Id 5 and SCCPCH configuration D is allocated Id 2. Therefore, the Message 2 may explicitly identify a configuration in the Message 1 by referencing the specific Id number allocated to the configuration.

The method of the second embodiment of the invention is advantageous in the event the entry positions of the configurations in the Message 1 change. For example, if the entry position of SCCPCH configuration A in the Message 1 of FIG. 11 was moved from a first position to a third position on the list as a result of a new configuration being added to the Message 1, the specific Id 6 allocated to SCCPCH configuration A would remain the same. Thus, when the Message 2 references SCCPCH configuration A, the Message 2 continues to use the specific Id 6. Hence, the Message 2 does not need to change the identifier used to reference the configuration as a result of the configuration having its entry position changed in the Message 1. Preferably, this method can be used when a service is transmitted on an SCCPCH that is listed in SIB 5 or SIB 6 to reference the SIB defined there. This method can also be used to indicate SCCPCHs available in neighboring cells with which SCCPCHs of the current cell can be combined with.

The foregoing embodiments and advantages are merely exemplary and are not to be construed as limiting the present teaching can be readily applied to other types of apparatuses. The description present invention is intended to be illustrative, and not to limit the scope of the claims. Many alternatives, modifications, and variations will be apparent to those skilled in the art. In the claim, means-plus-function clauses are intended to cover the structures described herein as performing the recited function and not only structural equivalents but also equivalent structures.

What is claimed is:

1. A method for referencing at least one physical channel carrying point-to-multipoint service data in a wireless communication system, the method comprising:
   receiving a first message comprising configuration information and an identity for the configuration information for each of the at least one physical channel,
   wherein the first message is received through a Multimedia Broadcast Multicast Service (MBMS) point-to-multipoint Control Channel (MCCH),
   wherein the configuration information for each of the at least one physical channel is organized into a list in the first message,
   wherein the configuration information for each of the at least one physical channel is used in a current cell;
   receiving a second message referencing at least one of the configuration information in the first message,
   wherein an identity for configuration information included in the second message is the same as the identify for the configuration information included in the first message,
   wherein the second message is received through a MCCH; and
   configuring the at least one physical channel according to the configuration information in the first message referenced by the second message,
   wherein the configured at least one physical channel, which is referenced by the second message, is used in a neighboring cell,
   wherein the at least one physical channel is a secondary common control physical channel (SCCPCH).

2. The method of claim 1, wherein the first message is received through a broadcast control channel (BCCH).

3. The method of claim 1, wherein the first message is a system information message.

4. The method of claim 1, wherein the first message is a point-to-multipoint service control message.

5. The method of claim 1, wherein the second message is a point-to-multipoint service control message.

6. A method for referencing at least one physical channel carrying point-to-multipoint service data in a wireless communication system, the method comprising:

generating a first message comprising configuration information and an identityfor each of at least one for the configuration information for each of the at least one physical channel;

organizing the configuration information for each of the at least one physical channel into a list in the first message;

transmitting the first message to a mobile terminal, wherein the first message is transmitted through a Multimedia Broadcast Multicast Service (MBMS) point-to multipoint Control Channel (MCCH), wherein the configuration information for each of the at least one physical channel is used in a current cell of the mobile terminal;

generating a second message for referencing at least one of the configuration information in the first message, wherein the at least one physical channel is configured by the mobile terminal according to the configuration information, wherein an identity for configuration information included in the second message is the same as the identity for the configuration information included in the first message, wherein the second message is transmitted through a MCCH, wherein the configured at least one physical channel, which is referenced by the second message, is used in a neighboring cell of the mobile terminal; and transmitting the second message to the mobile terminal, wherein the at least one physical channel is a secondary common control physical channel (SCCPCH).

7. The method of claim 6, wherein the first message is transmitted through a broadcast control channel (BCCH).

8. The method of claim 6, wherein the first message is a system information message.

9. The method of claim 6, wherein the first message is a point-to-multipoint service control message.

10. The method of claim 6, wherein the second message is a point-to-multipoint service control message.

11. A method for referencing at least one physical channel carrying point-to-multipoint service data in a wireless communication system, the method comprising:

receiving a first message comprising configuration information for each of the at least one physical channel, wherein each configuration information is identified by a configuration identifier in the first message, wherein the configuration information for each of the at least one physical channel is used in a current cell, wherein the first message is received through a Multimedia Broadcast Multicast Service (MBMS) point-to-multipoint Control Channel (MCCH);

receiving a second message referencing at least one of the configuration information in the first message, wherein the configuration information is referenced by identifying the configuration identifier, wherein an identity for configuration information included in teh second message is the same as the configuration identifier in the first message, wherein the second message is received through a MCCH; and configuring the at least one physical channel according to the configuration information in the first message referenced by the second message, wherein the configured at least one physical channel, which is referenced by the second message, is used in a neighboring cell, wherein the at least one physical channel is a secondary common control physical channel (SCCPCH).

12. The method of claim 11, wherein the first message is received through a broadcast control channel (BCCH).

13. The method of claim 11, wherein the first message is a system information message.

14. The method of claim 11, wherein the first message is a point-to-multipoint service control message.

15. The method of claim 11, wherein the second message is a point-to-multipoint service control message.

16. A method for referencing at least one physical channel carrying point-to-multipoint service data in a wireless communication system, the method comprising:

generating a first message comprising configuration information for each of the at least one physical channel;

allocating a configuration identifier to each configuration information in the first message;

transmitting the first message to a mobile terminal, wherein the first message is transmitted through a Multimedia Broadcast Multicast Service (MBMS) point-to-multipoint Control Channel (MCCH), wherein the configuration information for each of the at least one physical channel is used in a current cell of the mobile terminal;

generating a second message for referencing at least one of the configuration information in the first message, wherein the configuration information is referenced by identifying the configuration identifier and the at least one physical channel is configured by the mobile terminal according to the configuration information, wherein an identity for configuration information in the second message is the same as the configuration identifier in the first message, wherein the second message is transmitted through a MCCH, wherein the configured at least one physical channel, which is referenced by the second message, is used in a neighboring cell of the mobile terminal; and transmitting the second message to the mobile terminal, wherein the at least one physical channel is a secondary common control physical channel (SCCPCH).

17. The method of claim 16, wherein the first message is transmitted through a broadcast control channel (BCCH).

18. The method of claim 16, wherein the first message is a system information message.

19. The method of claim 16, wherein the first message is a point-to-multipoint service control message.

20. The method of claim 16, wherein the second message is a point-to-multipoint service control message.

* * * * *